United States Patent [19]

Hersom et al.

[11] 4,411,601

[45] Oct. 25, 1983

[54] PUMP FOR METERING TWO DISTINCT FLUIDS

[75] Inventors: Albert C. Hersom, Beaconsfield; Kenneth W. Wright, Twyford, both of England

[73] Assignee: Societe d'Assistance Technique pour Produits Nestle S.A., Lausanne, Switzerland

[21] Appl. No.: 236,173

[22] Filed: Feb. 20, 1981

[30] Foreign Application Priority Data

Dec. 16, 1980 [GB] United Kingdom ............... 8040195

[51] Int. Cl.³ ..................... F04B 15/02; F04B 21/02
[52] U.S. Cl. ................................ 417/388; 417/509; 417/518; 222/129.2; 222/135; 222/145
[58] Field of Search ............... 417/383, 388, 518, 510, 417/508, 509; 222/135, 145, 129.2; 366/136, 137

[56] References Cited

U.S. PATENT DOCUMENTS

| 2,566,436 | 9/1951 | Waite | 222/129.2 X |
| 2,585,172 | 2/1952 | Reynolds | 222/129.2 X |
| 3,207,384 | 9/1965 | Wall | 222/145 X |
| 3,228,560 | 1/1966 | Tacchi | 417/377 X |
| 3,254,845 | 6/1966 | Schlosser | 417/388 X |
| 3,930,756 | 1/1976 | Bruggeman | 417/383 X |
| 4,047,850 | 9/1977 | Berthelot | 417/383 |
| 4,192,361 | 3/1980 | Moser | 417/518 X |
| 4,332,335 | 6/1982 | Florentini | 222/145 |

FOREIGN PATENT DOCUMENTS

| 946768 | 8/1954 | Fed. Rep. of Germany | 417/510 |
| 2227772 | 11/1974 | France | 417/518 |

*Primary Examiner*—Leonard E. Smith
*Attorney, Agent, or Firm*—Vogt & O'Donnell

[57] ABSTRACT

A pump for metering two fluids comprising a cylinder having a first and second inlet conduit and an outlet conduit, means for closing the communication between the cylinder and the first inlet conduit and between the cylinder and the outlet conduit alternately, there being present inside the cylinder a first floating solid piston for drawing in a primary fluid from the first inlet conduit and discharging it into the outlet conduit and a second piston for drawing in a secondary fluid from the second inlet conduit which piston has at least one port provided with one or more valves through which the secondary fluid can flow to occupy the space between the two pistons where it can transmit the motion of the second piston to the first piston, and a by-pass for conveying secondary fluid from the space between the pistons to the outlet conduit.

11 Claims, 7 Drawing Figures

PUMP FOR METERING TWO DISTINCT FLUIDS

The present invention relates to a pump, more particularly to a pump intended for metering two distinct fluids.

In pumps, air is normally present behind the piston and this air usually contains small amounts of dirt as impurity. In an aseptic process such as, for example, the metering of a food product, leakage of the product often occurs around the piston and this product can become infected by microorganisms which can gain access from air behind the piston. This air normally has to be vented to the atmosphere in order to avoid pressurisation during each backward stroke of the piston. It is usually maintained sterile by elaborate means such as the provision of air filters. Furthermore, after discharge some product if often left adhering to the walls of the outlet and to the front end of the piston which not only presents a further risk of infection but also causes inaccuracies in metering.

In our co-pending European Patent Application (Publication No. 0012467) there is described and claimed a pump comprising a cylinder having a first and a second inlet and an outlet, means for closing communication between the cylinder and the first inlet and between the cylinder and the outlet, and, inside the cylinder, two movable pistons each having at least one port provided with one or more valves. The pump described is intended for metering and mixing a relatively thick fluid, or a suspension of solid particles in a liquid with, for example, another liquid. The mixing takes place by one fluid flowing into the other through one or more ports in the piston which separates the two fluids and may occur within the cylinder. This pump is suitable for metering and mixing large food particles in suspension with sterile water under aseptic conditions, thus avoiding the need for air filters.

We have now devised a pump which is suitable for metering two distinct sterile fluids as would be required in a food or pharmaceutical process under aseptic conditions but which is more versatile in that mixing of the fluids is optional. Also, the pump overcomes the problems encountered in conventional piston fillers where residual product is left adhering to walls of the output and to the front end of the piston after discharge. Moreover, the pump can easily be maintained in a clean condition between operations.

Accordingly, the present invention provides a pump for metering two fluids comprising a cylinder having a first and second inlet conduit and an outlet conduit, means for closing the communication between the cylinder and the first inlet conduit and between the cylinder and the outlet conduit alternately, there being present inside the cylinder a first floating solid piston for drawing in a primary fluid from the first inlet conduit and discharging it into the outlet conduit and a second piston for drawing in a secondary fluid from the second inlet conduit which piston has at least one port provided with one or more valves through which the secondary fluid can flow to occupy the space between the two pistons where it can transmit the motion of the second piston to the first piston, and a by-pass for conveying secondary fluid from the space between the pistons to the outlet conduit.

The valve on the second piston is preferably a non-return valve which is adapted to close when the second piston moves towards the first piston thus creating a hydraulic pressure in the secondary fluid between the pistons which causes the first piston to move towards its forward stop position to discharge the primary fluid. Conveniently, the by-pass is provided with a valve, preferably a non-return valve. The non-return valve is advantageously set to open at a predetermined hydraulic pressure, preferably one which is attained after the primary fluid has been discharged and the first piston has reached its forward stop position, by further movement of the second piston towards the first piston causing secondary fluid to flow from the cylinder to the outlet conduit.

Preferably the means for closing the communication between the cylinder and either the first inlet conduit or the outlet conduit is provided by a sliding shuttle valve which conveniently has a port by way of which the primary fluid may flow into the cylinder from the first inlet conduit. Preferably, the shuttle valve is adapted to wipe the front face of the first piston located at its forward stop position as it slides to close the communication between the cylinder and the outlet conduit and advantageously the shape of the front face of the first piston is correlated with the shape of the wiping surface of the shuttle valve. In an especially preferred embodiment, the wiping surface of the shuttle valve is semi-cylindrical while the first piston has a complementary concave front face with a radius corresponding to that of the wiping surface of the shuttle valve and is positioned to reciprocate in the cylinder in such a way that when it is at its forward stop position, the convex semi-cylindrical wiping surface of the shuttle valve wipes its concave front face as the shuttle valve slides to close the communication between the cylinder and the outlet conduit.

The first piston may be provided with a guide means to prevent it rotating as it slides in the cylinder.

Both the pistons and the shuttle valve may be provided with integral guide rods. The pistons, shuttle valve and the guide rods may beneficially be fitted with gaskets to prevent leakages which are particularly undesirable in an aseptic process. The cylinder may be provided with stops to limit the stroke of the first piston and these are preferably adjustable so that the ratio of the two fluids may be varied if desired. Both the second piston and the shuttle valve may be actuated mechanically by cam systems, by which means their movements may be synchronised. Each cam system may take the form of a rail on a rotary filler.

Both fluids may be held in reservoirs under slight positive pressure which may be adjusted to assist the dynamics of the filling action.

By means of this pump the two fluids are metered and discharged sequentially and if mixing is desired it takes place after discharge outside the cylinder. The second fluid that is discharged may wash away any remains of the first fluid that is left adhering to the walls of the outlet and this can result in not only the production of a more accurate and uniform metering but also the reduction of the risk of infection which is most important in an aseptic process.

The pump of the present invention is particularly suitable for metering a relatively thick fluid such as a suspension of solid particles in a liquid with a homogeneous liquid. The relatively thick fluid is preferably the primary fluid and the homogeneous liquid is preferably the secondary fluid. The pump may advantageously be used for metering and optionally mixing either a food product or a pharmaceutical product.

In a food process the primary fluid may be a sterile suspension containing large food particles such as a soup or a stew and the secondary fluid may be a sterile fluid such as sterile water. The secondary fluid which is sterile, may be present behind the means for closing the communication between the cylinder and either the first inlet conduit or the outlet conduit by a connection from the secondary fluid reservoir.

It is possible to carry out in-place cleaning of the pump of the present invention without extensive dismantling, and pre-sterilisation can be performed with either steam or pressurised water at about 130° C.

The present invention will now be further described by way of example with reference to the accompanying drawings in which.

Referring to the drawings the pump comprises a cylinder 1 arranged in two parts 1a and 1b at right angles to one another. Part 1a comprises a measuring cylinder 2 having a port 3 and fitted with an end cap 4 by means of a flange joint 5. The measuring cylinder 2 connects with an inlet 6 to allow entry of a primary fluid and an outlet 7 while there is a passage 8 connecting the interior of end cap 4 with the interior of part 1b. Both the end cap and part 1b contain a secondary fluid. Both the primary fluid and the secondary fluid are held in reservoirs (not shown) under positive pressure. A floating piston 9 having an integral guide rod 10 is free to reciprocate whithin the cylinder 2. A seal 11 may be fitted to the piston 9 to separate the primary fluid in front of the piston from the secondary fluid at the rear of the piston. The forward position of the piston 9 and guide rod 10 is limited by a pin 12 engaging with the end of slots 13 at its forward end in a guide tube 14 which is clamped by means of a support flange 15 between the flanges of the measuring cylinder 2 and the end cap 4. The position is a permanently fixed one, i.e. fully forward. The interaction of the pin 12 with the slots 13 in the guide tube 14 also prevents the piston from rotating. The rearward position of the piston 9 is adjustable and is governed by the guide rod 10 engaging with a back-stop bush 16. The position of this bush 16 which slides within the guide tube 14 and is prevented from turning by a pin 17 which engages in the slots 13, can be adjusted axially by rotating a screw 18 which engages with the bush itself, thus enabling the volumetric displacement of the piston 9 to be pre-set. The screw 18 is actuated externally and 'O' ring seals 19 are fitted to maintain a leak-free or aseptic operation. The end cap has an outlet 20 which connects with a discharge nozzle 21 by means of a tubular by-pass 22 fitted with a non-return valve 23 provided with a spring which is set to open at a predetermined pressure. The guide tube 14 has holes 24 drilled in its support flange 15 and these holes allow the free flow of secondary fluid to the back of the piston 9 at all times.

Part 1b of the cylinder 1 is provided with an inlet 25 and outlet 26 and contains a piston 27 having an integral piston rod 28. The piston 27 is provided with ports 29 fitted with non-return valves 30 which control the flow of the secondary fluid between the front and back of the piston. An 'O' ring 31 is fitted to the piston 27 to prevent leakage and the piston rod 28 is surrounded by a steam seal 32. The piston rod 28 is actuated by a cam system, for example a rail on a rotary filler, which is so designed that the stroke of the piston can be varied and also so that one or more dwell periods can be arranged as required between the beginning and end of the desired stroke.

A shuttle valve 33 having an integral valve rod 34 and a port 35 reciprocates in a cut-off cylinder 36 which is connected to the inlet 6, the port 3 and the discharge nozzle 21. An inlet port 37 is provided for a supply of sterile water from the cylinder 1b via its outlet port 26 and the interconnecting tube 38 to maintain sterility behind the shuttle valve and its associated valve rod 34. The valve rod is surrounded by a steam seal 39 and is actuated by a cam system, for example a rail on a rotary filler, which is synchronised with the cam that actuates the piston rod 28. The shuttle valve is provided with an 'O' ring 40 to give a seal between the primary liquid side of the shuttle valve and the sterile air behind the shuttle valve. The front face of the piston 9 is concave and its radius corresponds with the radius of the shuttle valve 33.

Figure 1:
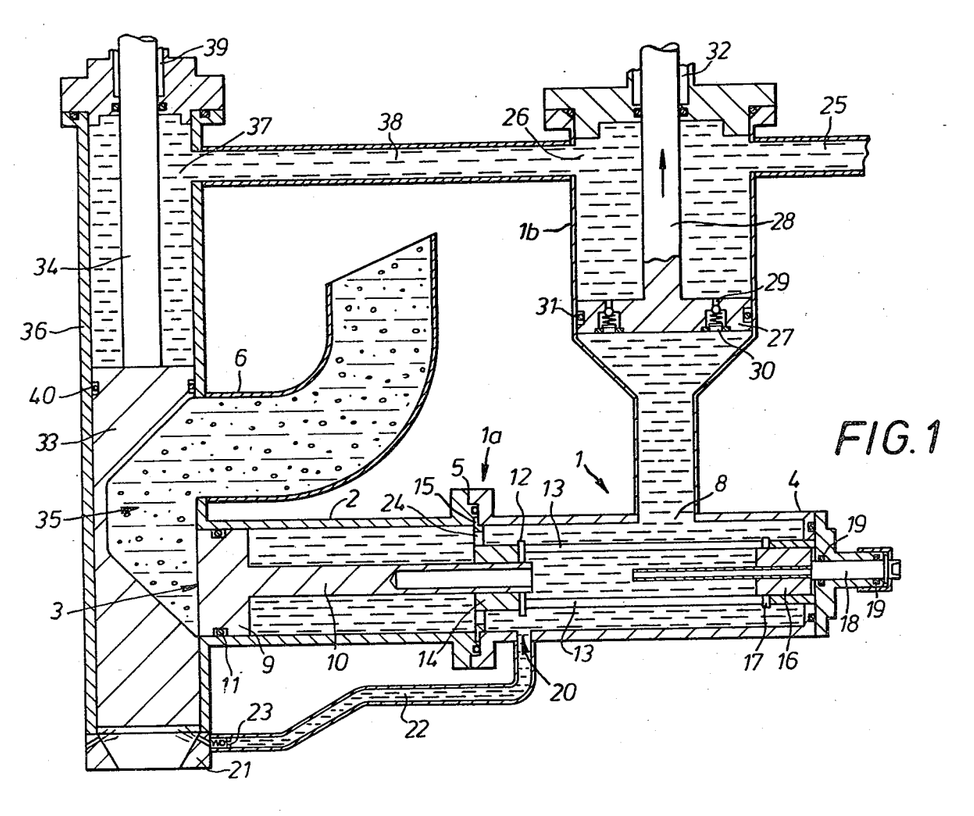
FIG. 1 is a diagrammatic section of a pump showing the components at the commencement of the metering stroke.

In operation, beginning with the position shown in FIG. 1, at the commencement of the filling cycle with the shuttle valve 33 in the down position, the piston 27 moves upwards reducing the hydraulic pressure of the secondary fluid and also allows the non-return valves 30 to open. The positive pressure in the secondary fluid assists this action. The floating piston 9 is thus induced to move backwards and this movement is assisted by the pressure contribution from the primary fluid which enters the measuring cylinder 2 from the inlet 6 via the port 35 of the shuttle valve 33. The movement may also be spring assisted. The secondary fluid behind the piston 9 can flow readily between the measuring cylinder 2 and the end cap 4 via holes 24 provided in the support flange 15 of the guide tube 14.

Figure 2:
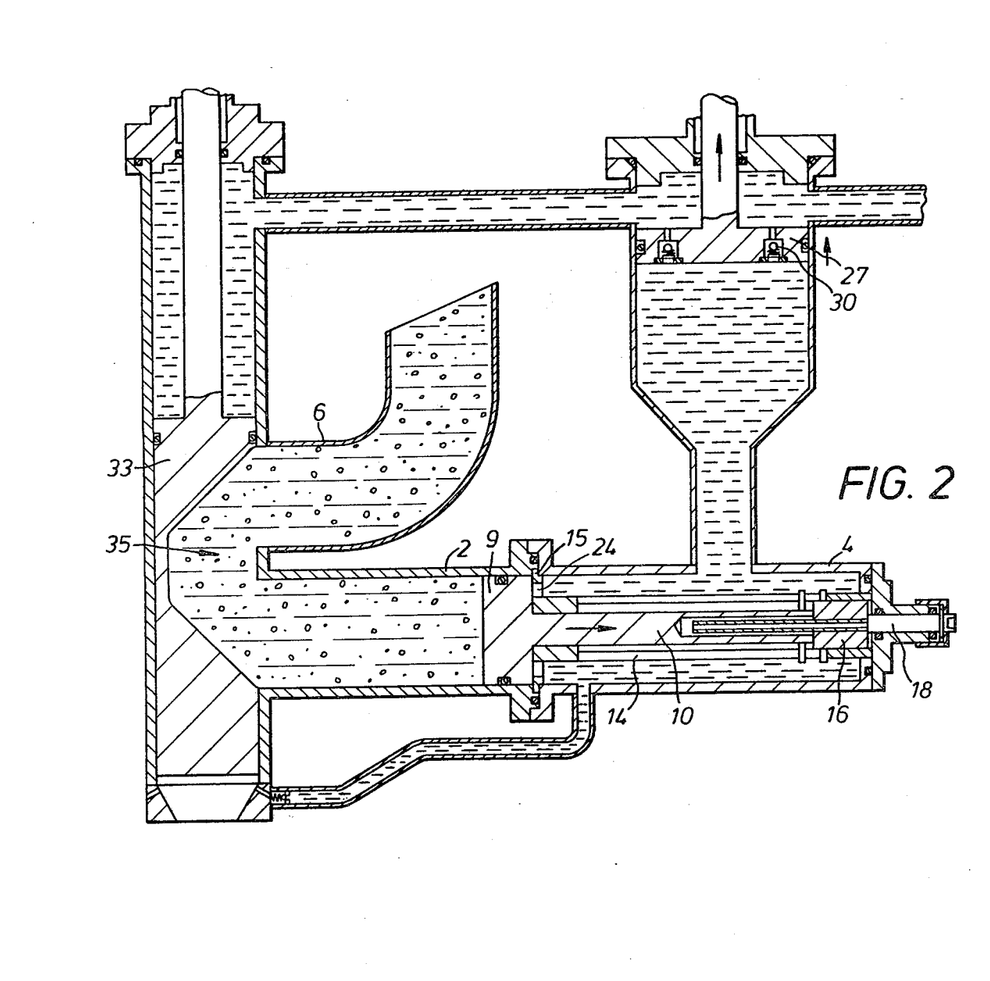
FIG. 2 is the same section as in FIG. 1 showing the components at the termination of the metering stroke.

The piston 9 is pushed back until the guide rod 10 reaches the back-stop bush 16 as shown in FIG. 2, and is held in this position provided that the pressure of the primary fluid is maintained above that of the secondary fluid.

Figure 3:
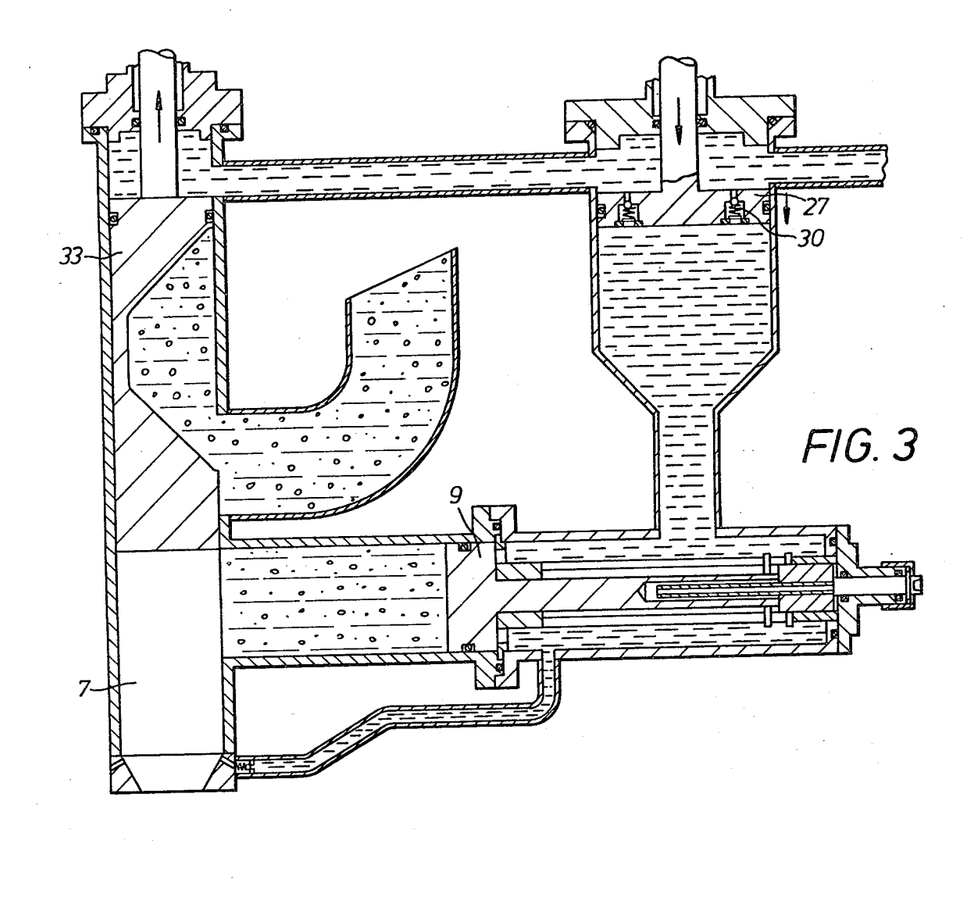
FIG. 3 is the same section as in FIG. 1 showing the components at the commencement of the discharge stroke.

The shuttle valve 33 then rises to shut off the supply of primary fluid as shown in FIG. 3. The sterile water behind the shuttle valve is forced back through the inlet 37, the interconnecting tube 38 and the outlet 26 into the cylinder 1b above the rear face of the piston 27 and can flow back to the reservoir via inlet 25. The piston 27 starts to descend immediately closing the non-return valves 30 thus enclosing the secondary fluid between the two pistons 9 and 27 so that a hydraulic pressure is created which transmits the motion of piston 27 to piston 9.

Figure 4:
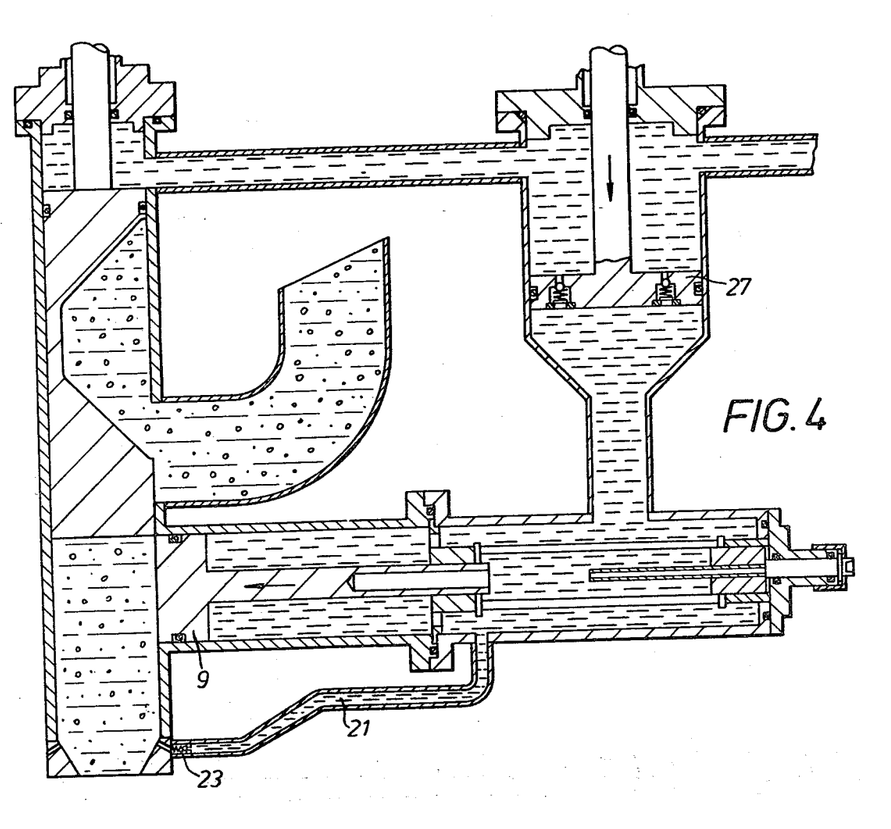
FIG. 4 is the same section as in FIG. 1 showing the components at the termination of the discharge of the primary fluid.

The piston 9 descends until the piston 9 reaches its forward stop position discharging the primary fluid as shown in FIG. 4. The displacement volume of the secondary fluid is equal to the displacement volume of the primary fluid and the set spring pressure in the non-return valve 23 is sufficient to prevent the secondary fluid from flowing into the discharge nozzle 21. The primary fluid flows through the discharge nozzle into a can (not shown).

Figure 5:
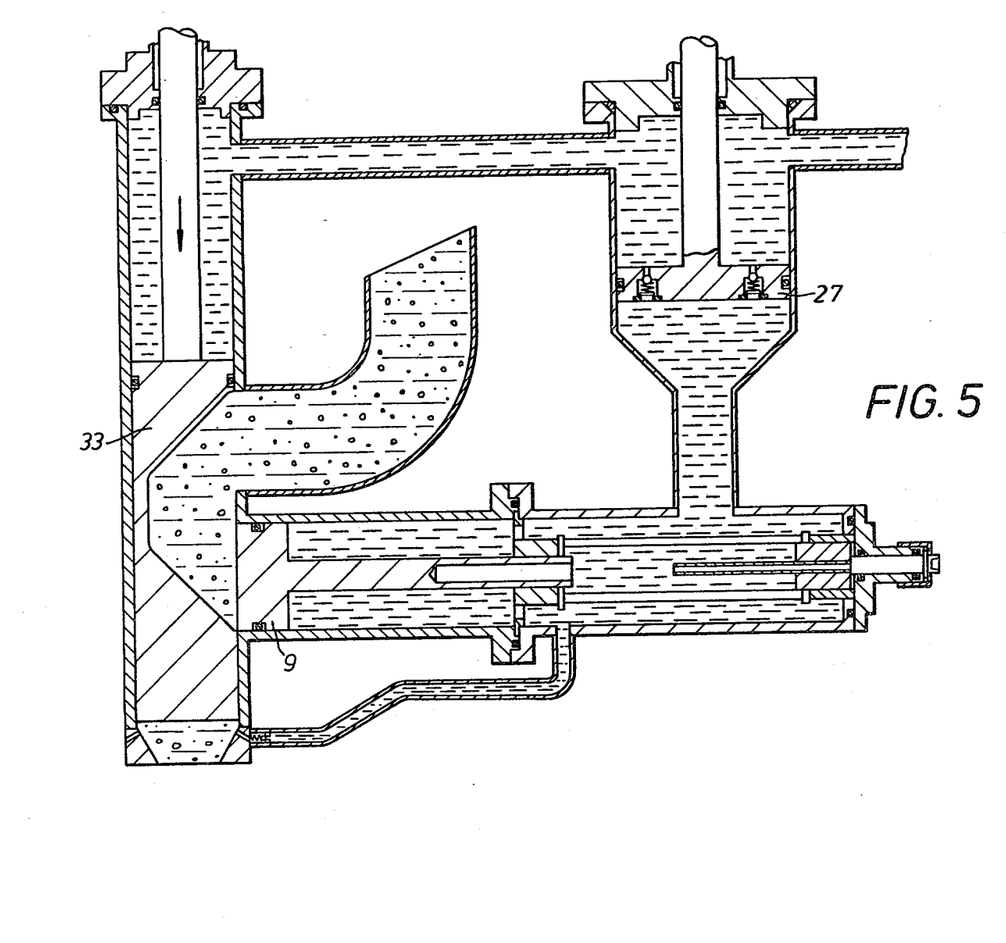
FIG. 5 is the same section as in FIG. 1 showing the components after the shuttle valve has descended.
Figure 7:
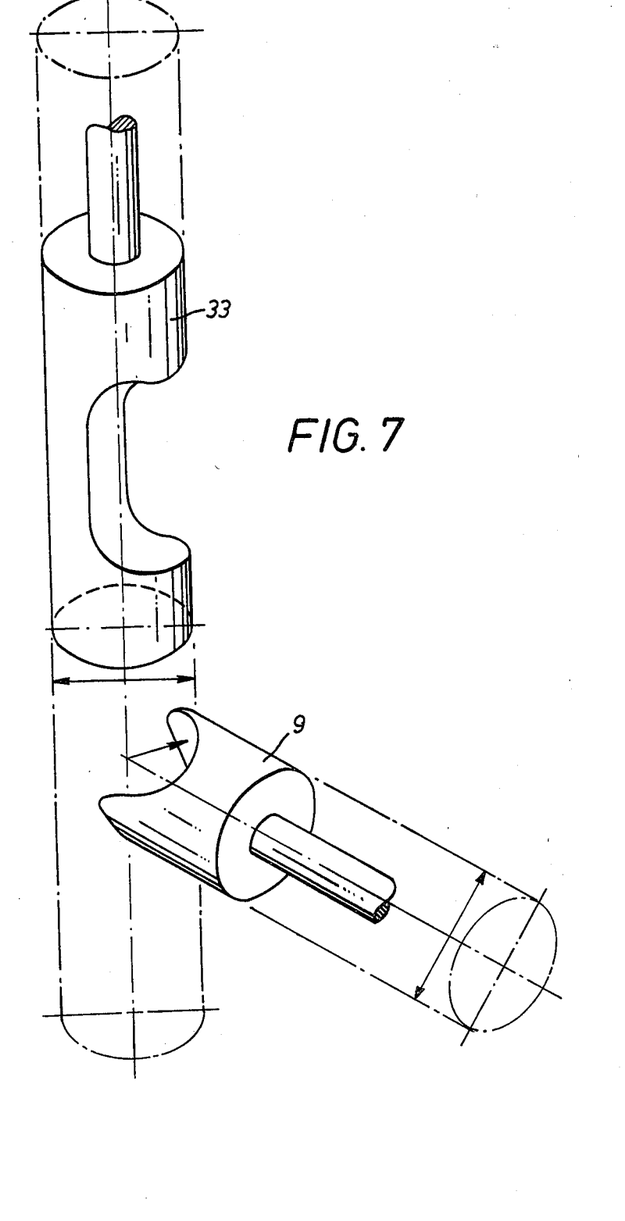

The shuttle valve 33 descends to the down position wiping any remaining product from the concave front face of the piston 9 which is machined to have a radius corresponding with the radius of the shuttle valve as shown in FIG. 7. The efficiency of the wiping action is ensured by designing the pump so that the piston 9 cannot rotate by utilising the guide tube 14 with slots 13 and the pin 12. The speed of descent of the shuttle valve is sufficient to throw off any product adhering to the bottom. During the descent of the shuttle valve 33 the space above the valve is filled with sterile water which can flow from the sterile water reservoir via inlet 25, outlet 26, interconnecting tube 38 and inlet 37. The piston 27 remains in an intermediate stop position due to a dwell period on the cam and this position is shown in FIG. 5.

Figure 6:
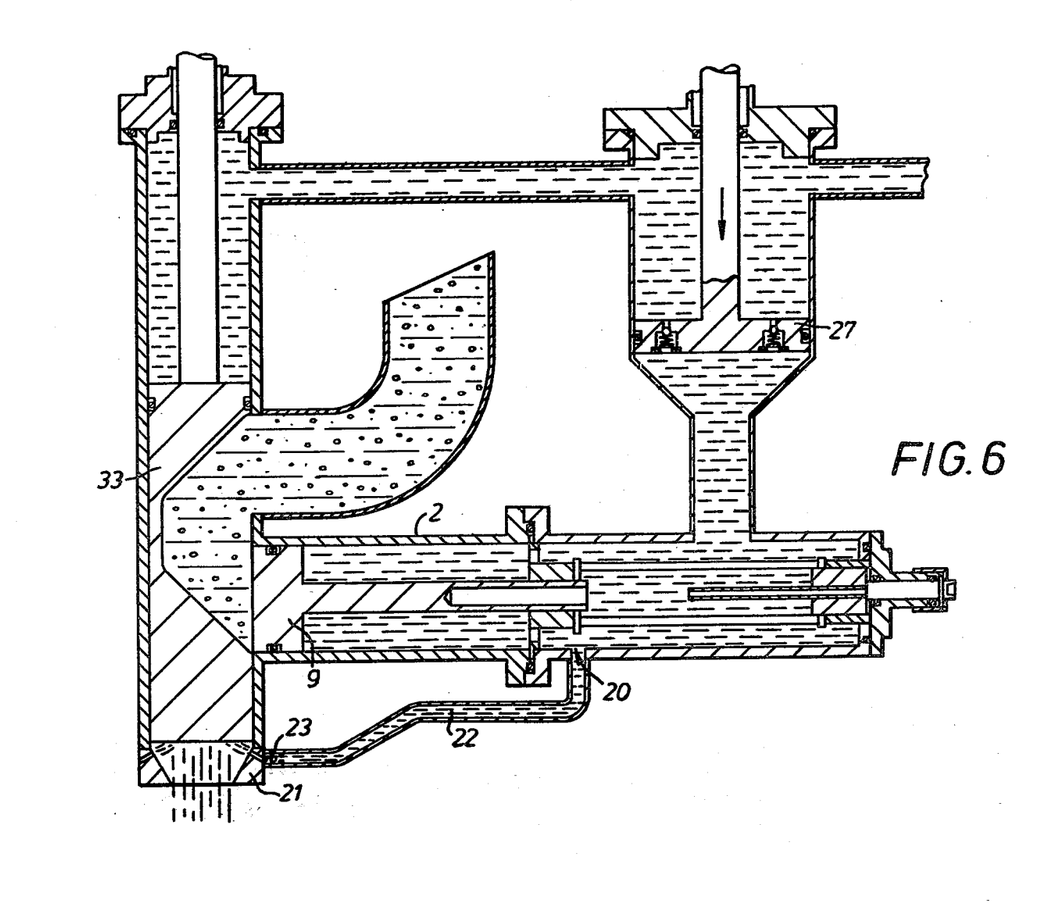
FIG. 6 is the same section as in FIG. 1 showing the components at the time of the discharge of the secondary fluid and FIG. 7 is a perspective view of the shuttle valve and the floating piston to illustrate their correlating shapes.

The piston 27 starts to descend again and since the piston 9 is at its forward stop position, the hydraulic pressure of the secondary fluid behind the piston 9 increases and is communicated through the outlet 20 through the by-pass 22 to the spring loaded non-return valve 23 set to open at a predetermined pressure. When this predetermined pressure is attained the valve 23 opens and the secondary fluid flows into the void of the discharge nozzle 21 until the piston 27 stops moving. The amount of secondary fluid injected into the discharge nozzle void 21 is related to the stroke length of the piston 27 which in turn is fixed by the ratio of secondary fluid to primary fluid required by the product specification. The injection of the secondary fluid into the void of the discharge nozzle washes away all traces of primary fluid from the end of the shuttle valve 33 and from the internal surfaces of the discharge nozzle and then mixes with the primary fluid which has previously been discharged from the measuring cylinder 2.

We claim:

1. A pump for metering two fluids comprising a cylinder having a first and second inlet conduit and an outlet conduit, means for closing the communication between the cylinder and the first inlet conduit and between the cylinder and the outlet conduit alternately, there being present inside the cylinder a first floating solid piston for drawing in a primary fluid from the first inlet conduit and discharging it into the outlet conduit and a second piston for drawing in a secondary fluid from the second inlet conduit which piston has at least one port provided with one or more valves through which the secondary fluid can flow to occupy the space between the two pistons where it can transmit the motion of the second piston to the first piston, and a by-pass for conveying secondary fluid from the space between the pistons to the outlet conduit said by-pass having means permitting the operation of the by-pass during the entire operating cycle of the pump.

2. A pump according to claim 1 wherein the first piston is provided with a guide means to prevent it rotating as it slides in the cylinder.

3. A pump according to claim 1 wherein the valve on the second piston is a non-return valve which is adapted to close when the second piston moves towards the first piston thus creating a hydraulic pressure in the secondary fluid between the pistons which causes the first piston to move towards its forward stop position to discharge the primary fluid.

4. A pump according to claim 1 or claim 3 wherein the by-pass is provided with a non-return valve set to open at a predetermined hydraulic pressure.

5. A pump according to claim 4 wherein the predetermined hydraulic pressure is a pressure which is attained after the primary fluid has been discharged and the first piston has reached its forward stop position, by further movement of the second piston towards the first piston causing secondary fluid to flow from the cylinder to the outlet conduit.

6. A pump according to claim 1 wherein the means for closing the communication between the cylinder and either the first inlet conduit or the outlet conduit is provided by a sliding shuttle valve.

7. A pump according to claim 6 wherein the second piston and the shuttle valve are actuated mechanically by cam systems by which means their movements are synchronised.

8. A pump according to claim 6 wherein the shuttle valve is provided with a port which allows the primary fluid to flow into the cylinder from the first inlet conduit.

9. A pump according to claim 6 or claim 8 wherein the shuttle valve is adapted to wipe the front face of the first piston located at its forward stop position as it slides to close the communication between the cylinder and the outlet conduit.

10. A pump according to claim 9 wherein the shape of the front face of the first piston is correlated with the shape of the particular part of the shuttle valve which wipes it.

11. A pump according to claim 10 wherein the wiping surface of the shuttle valve is semi-cylindrical while the first piston has a complementary concave front face with a radius corresponding to that of the wiping surface of the shuttle valve and is positioned to reciprocate in the cylinder in such a way that when it is at its forward stop position, the convex semi-cylindrical wiping surface of the shuttle valve wipes its concave front face as the shuttle valve slides to close the communication between the cylinder and the outlet conduit.

* * * * *

UNITED STATES PATENT AND TRADEMARK OFFICE
CERTIFICATE OF CORRECTION

PATENT NO. : 4,411,601
DATED : October 25, 1983
INVENTOR(S) : Albert C. Hersom, et al.

It is certified that error appears in the above—identified patent and that said Letters Patent is hereby corrected as shown below:

Col. 1, Line 36, "particles" should read --particulates--.

Col. 1, Line 45, "output" should read --outlet--.

Signed and Sealed this

Third Day of January 1984

[SEAL]

Attest:

GERALD J. MOSSINGHOFF

*Attesting Officer*    *Commissioner of Patents and Trademarks*